May 19, 1964
L. J. LAPOINTE
3,133,453
NUT AND LEAD SCREW MECHANISM
Filed June 28, 1962
2 Sheets—Sheet 1
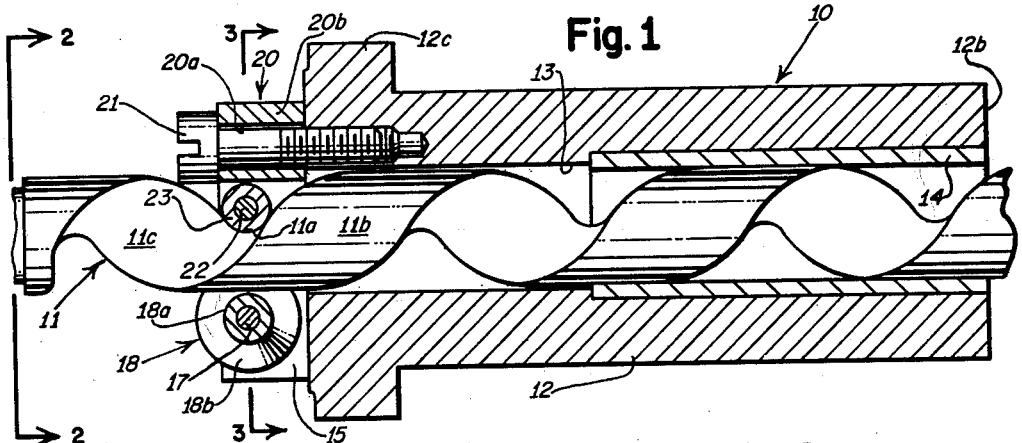
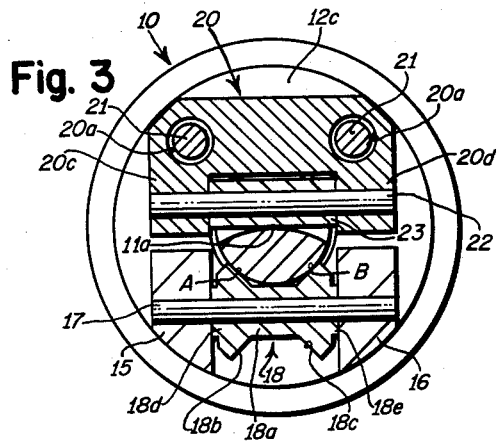
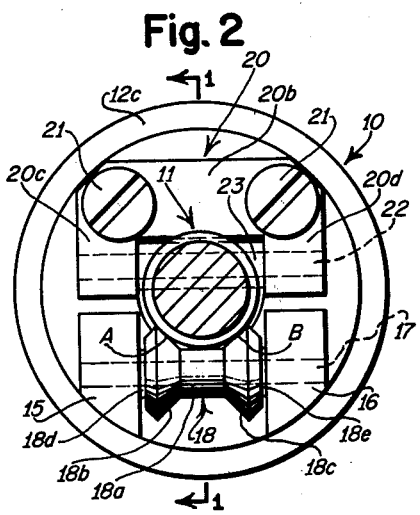
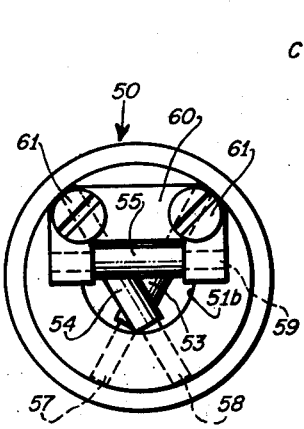
Fig. 7    Fig. 9
INVENTOR
LLOYD J. LAPOINTE
BY
ATTORNEYS May 19, 1964  L. J. LAPOINTE  3,133,453
NUT AND LEAD SCREW MECHANISM
Filed June 28, 1962  2 Sheets-Sheet 2

INVENTOR
LLOYD J. LAPOINTE

BY
ATTORNEYS

United States Patent Office 3,133,453
Patented May 19, 1964

3,133,453
NUT AND LEAD SCREW MECHANISM
Lloyd J. Lapointe, West Hartford, Conn., assignor to Royal McBee Corporation, New York, N.Y., a corporation of New York
Filed June 28, 1962, Ser. No. 205,991
4 Claims. (Cl. 74—424.8)

This invention relates to an improved nut and lead screw mechanism (of the type shown in U.S. Patent Re. 25,166) and more particularly to a rolling adjustable coupling between a nut and a mating lead screw of relatively large pitch.

In mechanisms of this nature, it is highly desirable that there be no back-lash or play between the lead screw and nut as in many instances the motion must be transmitted with a high degree of accuracy. To attain such accuracy it is conventional to resort to high precision machining so as to hold the parts within narrow tolerance limits. This is, of course, very costly procedure and not completely satisfactory as there is usually no provision for compensating for wear of the parts after a period of use, such wear resulting in undesirable play and accordingly inaccurate motion transmission. In certain applications of a mechanism of this nature, for example where the nut comprises a portion of the body of a printing head in a matrix type writing machine, the nut may be the driving member to cause rotation of the screw under certain conditions whereas under other conditions the screw may be rotated to effect linear travel of the nut. In either event high precision motion transmission must be attained if the machine is to operate properly. It is accordingly among the objects of this invention to provide a simple and inexpensive nut and lead screw mechanism capable of high precision motion transmission.

It is another object of the invention to provide an adjustable coupling between the nut and feed screw whereby the two members may be initially coupled with the elimination of play therebetween and whereby they may be readjusted after a period of use to compensate for play resulting from wear. A still further object is to provide such a mechanism wherein function is reduced to a minimum.

Other objects will be in part apparent and in part pointed out hereinafter.

In the drawing wherein there is shown three embodiments of my invention and wherein similar reference characters refer to similar parts throughout the several views:

FIGURE 1 is a fragmentary sectional elevation of the nut and lead screw;

FIGURE 2 is a vertical section taken along the line 2—2 of FIGURE 1;

FIGURE 3 is a vertical section taken along the line 3—3 of FIGURE 1;

FIGURE 4 is a perspective view of the rollers comprising a part of the nut;

FIGURE 7 is a section taken along line 7—7 of FIGURE 6;

FIGURE 9 is a section taken along the line 9—9 of FIGURE 8.

Figure 5:
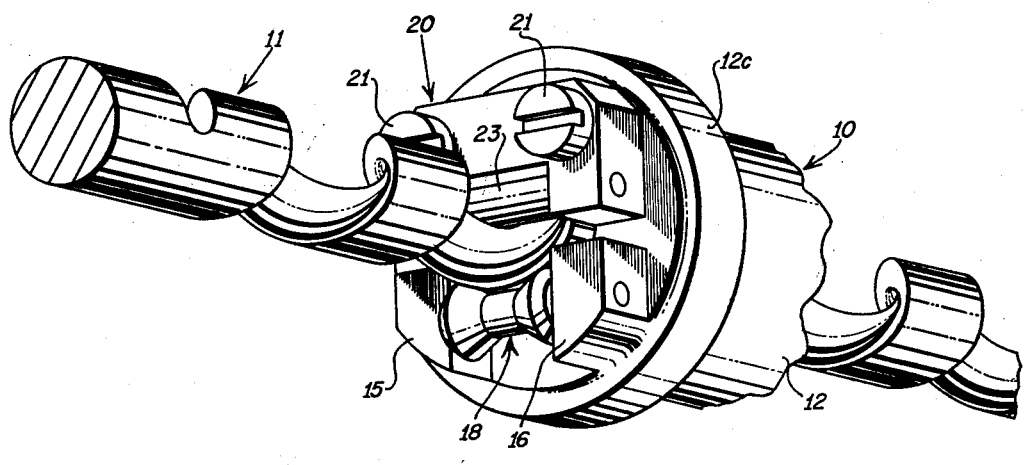
FIGURE 5 is a fragmentary isometric view of the nut and screw.

In general the mechanism includes a nut of suitable axial length having a journal bearing at one end to rotatably support the screw and a pair of opposed rollers at the other end between which the screw extends. The axes of these rollers in two of the embodiments are parallel to one another and transverse to the axis of the screw, one roller, which can be considered as a drive roller bearing against the screw at its zero diameter, i.e. this roller lies in the valley between adjacent threads and rotates the screw when the nut is the input element and moves the nut when the screw is the input element. The other roller comprises a rotatable bearing which preferably underlies the drive roller and supports the screw at angularly spaced points on the periphery thereof. The drive roller is adjustably secured to the body of the nut so that its axis is movable relative to that of the bearing whereby the play between the nut and screw may be easily adjusted to the desired amount.

Referring now to FIGURE 1 of the drawing, the nut and screw are generally indicated at 10 and 11 respectively. Nut 10 includes an elongated body 12 having a central bore 13 of slightly greater diameter than screw 11 and which rotatably receives the screw. One end 12b of nut body 12 has a bearing bushing 14 secured therein, as by a press or force fit for example, which journals the screw in that end of the nut. The axial length of bushing 14 is equal to or greater than one pitch of the thread on screw 11 thus to provide adequate bearing surface for the screw. The other end of nut body 12 has an integral enlarged portion 12c from which project axially extending preferably integral spaced shoulders 15 and 16. The tops of these shoulders lie in a plane that is preferably spaced slightly below the axis of screw 11.

Shoulders 15 and 16 rotatably support the ends of a pin 17 on which a bearing roller generally indicated at 18 is mounted. Roller 18 comprises a center cylindrical portion 18a that is flanked by frustro-conical bearing portions 18b and 18c integrally formed with which are spacers 18d and 18e respectively. Bearing roller 18 is carried by pin 17 between shoulders 15 and 16 below screw 11 with its axis at right angles to that of the screw so that the periphery of the screw is borne by point contact with bearing surfaces 18b and 18c. In other words, for any rotative position of screw 11 it rests on bearing surfaces 18b and 18c at points A and B only, for example, thus reducing friction between the screw and roller 18 to a minimum. Thus screw 11 is carried at one end of nut 10 by bushing 14 and at the other by roller 18.

As shown in FIGURE 2 a U-shaped drive roller mounting bracket, generally indicated at 20 is secured to the end of nut portion 12c as by a pair of screws 21 that extend through holes 20a in the base 20 of bracket 20 and are threaded into nut portion 12c (FIGURE 1). The diameters of holes 20a exceed those of screws 21 for a purpose to be described. The legs 20c and 20d of bracket 20 (see FIGURE 2) are suitably drilled to receive and support the ends of a pin 22 that rotatably supports a drive roller 23 between the legs with its axis parallel to that of bearing roller 18 and normal to that of screw 11. Roller 23 is disposed within the valley 11a between adjacent threads 11b and 11c of screw 11 preferably with its axis vertically coplanar with that of bearing roller 18, the plane in which these axes lie being normal to the axis of screw 11 and passing through the center of screw valley 11a.

As noted screw holes 20a are larger in diameter than the shanks of screws 21, hence roller 23 is adjustable with respect to the axis of screw 11 thus to control the play between the roller and screw. If desired, roller 18 may instead be adjustably mounted in similar manner. Thus when roller 23 is properly adjusted it drivingly engages the helical thread surface of the screw substantially along a line C (FIGURE 4) for one direction of movement and along line D for the opposite direction of movement thus reducing friction between this roller and screw 11 to a minimum while at the same time providing adequate driving area contact. The screw 11 is accordingly supported at two points by bearing roller surfaces 18b and 18c and drivingly engaged along one or the other of the lines C or D by drive roller 23.

It may now be seen that axial movement of nut 10 to the left, for example, as viewed in FIGURE 5 will result in counter clockwise rotation of screw 11; by the same token if screw 11 is rotated clockwise, nut 10 will be driven to the right. This action occurs because in the first instance the drive roller bears against the screw thread, along line D, in effect it tries to climb up the helix but being restrained from so doing its axial thrust is translated into rotary movement of the screw. On the other hand when the screw is rotated to drive the nut to the right, the screw becomes the driver and its thread thrusts against the roller 23 along line C, thus imparting linear motion to the nut.

Figure 6:
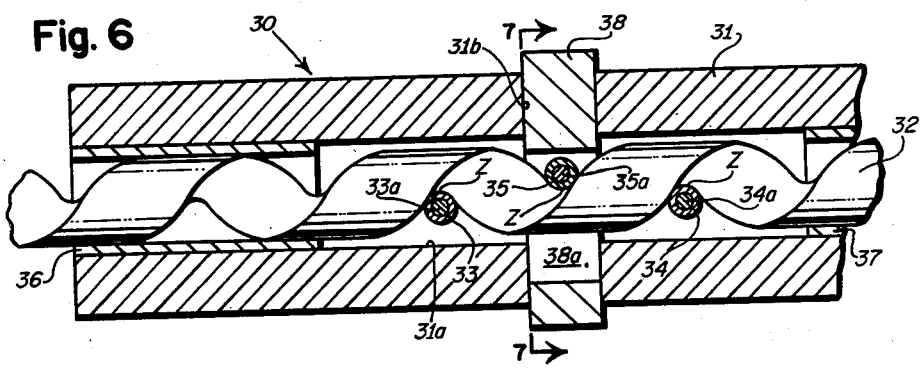
FIGURE 6 is a fragmentary sectional elevation of a modified form of the nut and lead screw.

A modified form of the nut and lead screw is generally indicated at 30 in FIGURES 6 and 7 and comprises a nut 31, a lead screw 32, a pair of fixed cylindrical rollers 33 and 34 and an adjustable roller 35. Nut 31 is of suitable axial length and has an axial bore 31a whose diameter is slightly greater than that of the lead screw so that the screw is freely rotatable therein. The ends of bore 31a are provided respectively with bearing bushings 36 and 37, secured in the bore as by a press or force fit or by a set screw (not shown) as desired, the length of each bushing being at least equal to one pitch of screw 32 thus to provide adequate bearing for the screw and preclude creation of a couple between the nut and screw.

Rollers 33 and 34 may be mounted any place in bore 31a of the nut between bushings 36 and 37 but preferably are centered therebetween so that the bearing load or thrust of the screw is supported symmetrically. These rollers are rotatably mounted respectively on pins 33a and 34a the ends of which are secured in the body of nut 31 in any suitable manner. The axes of pins 33a and 34a are parallel and coplanar and are normal to the axis of screw 32, rollers 33 and 34 preferably being disposed one pitch apart and engaging the screw at its zero diameter Z, the area of engagement being substantially point contact and accordingly providing a substantially frictionless bearing.

Roller 35 is similarly rotatably mounted on a pin 35a secured to a plug 38 adjustably mounted in nut 31. The axis of roller 35 is parallel to those of rollers 33 and 34 and lies in a plane spaced from but parallel to the plane of the axes of rollers 33 and 34. Preferably roller 35 is centered with respect to rollers 33 and 34 and lies in a valley of the screw so as to engage the screw at its zero diameter Z. Thus the three rollers 33, 34 and 35 are preferably equi-distantly spaced along the axis of screw 32, are centered with respect to bushings 36 and 37, and, as will appear, constitute both bearing and drive rollers for transmitting motion from the nut to the screw or vice versa.

As noted above, roller 35 is carried by plug 38. Plug 38 (FIGURE 7) is adjustably disposed in a slot 31b formed in the body of nut 31, preferably centrally thereof and includes a pair of legs 38a and 38b which define an aperture 38c formed in the plug in which roller 35 is disposed with the ends of its pin 35a being suitably secured in legs 38a and 38b respectively. Leg 38b of plug 38 is drilled and tapped to receive the threaded shank of a set screw 39 which extends through a hole 31c formed in the body of nut 31, the diameter of this hole being greater than that of the shank of screw 39. The opposite side of the nut and plug are similarly provided with a set screw 40. It will now be apparent that plug 38 is adjustable transversely of the nut and screw by an amount provided by the difference in the diameters of hole 31c and the shank of screw 39; accordingly the position of roller 35 with relation to the axis of screw 32, i.e. its zero diameter can be adjusted and the adjustment set by tightening screws 39 and thereby to determine the amount of play between the nut and screw upon initial assembly or to compensate for wear between the parts after a period of use.

It may now be seen that when screw 32 (FIGURE 6) is rotated, rollers 33, 34 and 35 become drivers for nut 31, the helical edge of the screw thread thrusting against the surfaces of the rollers near the ends thereof to drive the nut linearly. Conversely if the nut is forced linearly, the screw is rotated to become the driven member. Accordingly, in this embodiment of the invention a balanced three point drive is provided in a rolling adjustable coupling between the nut and screw.

Figure 8:
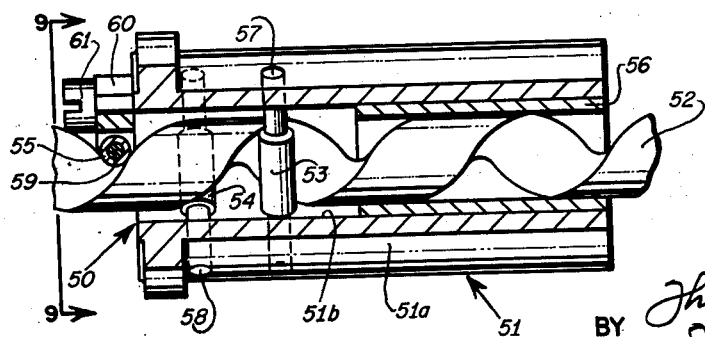
FIGURE 8 is a fragmentary sectional elevation of another modification of the nut and lead screw.

The third embodiment of the invention disclosed herein is generally indicated at 50 in FIGURES 8 and 9 and broadly comprises a nut 51, a screw 52 and a group of three spaced rollers, 53, 54 and 55. Nut 51 is generally similar to nut 10 (FIGURE 1) and accordingly comprises a body 51a having a central bore 51b of a diameter larger than that of screw 52, the screw being journaled at one end of the nut in a bearing bushing 56 similar to bushing 14 (FIGURE 1) secured in bore 51b.

Rollers 53 and 54 are rotatably mounted on pins 57 and 58 secured in any suitable manner to nut 51 with their axes including an angle of 120 degrees (see FIGURE 9). Roller 55 is rotatably mounted on a pin 59 the ends of which are carried in the legs of a U-shaped bracket 60 similar to bracket 20 (FIGURE 5). Bracket 60 is adjustably secured to nut 51 by a pair of screws 61 in the manner as bracket 20 so that roller 55 may be adjusted relative to the axis of screw 52 to determine the amount of play between the roller and the screw. The axis of roller 55 and that of roller 54 include an angle of 120 degrees. Thus the three rollers lie at 120 degrees to one another and are equidistantly spaced along the axis of screw 52 to establish a particularly efficient adjustable rolling coupling between the nut and screw.

It follows that rotation of the screw results in linear travel of the nut and vice versa.

I claim:

1. A motion transmitting device comprising, in combination, a nut having an axial bore extending therethrough, a lead screw rotatably disposed in said bore, a rotatable bearing member carried by said nut with its axis transverse to the nut axis and adapted to support said screw at angularly spaced portions of its periphery, said bearing member comprising a roller having spaced frustro-conical bearing surfaces on which said screw is supported at angularly spaced portions of the periphery thereof, and a drive member carried by said nut and engaging a thread of said screw whereby rotation of said screw causes axial movement of said nut.

2. A motion transmitting device comprising, in combination, a nut having an axial bore extending therethrough, a lead screw rotatably disposed in said bore, a plurality of rotatable members mounted on said nut with their axes normal to the axis of said screw, at least one of said members lying in a valley of the screw thread with its surface nearest the screw axis lying at said axis, and adjustable means mounting one of said members for movement toward or away from the screw axis whereby play between said members and said screw axis can be adjusted.

3. A device in accordance with claim 2 where said rotatable member comprises cylindrical rollers lying in spaced relation to one another along the axis of said screw.

4. A device in accordance with claim 3 wherein the axes of said rollers are serially disposed 120 degrees from one another.

References Cited in the file of this patent

UNITED STATES PATENTS

| | | |
|---|---|---|
| Re. 35,166 | Wise | May 8, 1962 |
| 630,398 | Nutting | Aug. 8, 1899 |
| 699,013 | Rauhoff | Apr. 29, 1902 |